United States Patent
Wu (10) Patent No.: US 10,996,475 B2
(45) Date of Patent: May 4, 2021

(54) ARRAYED WAVEGUIDE, DISPLAY DEVICE AND SPECTACLES DEVICE

(71) Applicant: BOE TECHNOLOGY GROUP CO., LTD., Beijing (CN)

(72) Inventor: Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 150 days.

(21) Appl. No.: 16/326,817

(22) PCT Filed: May 29, 2018

(86) PCT No.: PCT/CN2018/088874
§ 371 (c)(1),
(2) Date: Feb. 20, 2019

(87) PCT Pub. No.: WO2018/223873
PCT Pub. Date: Dec. 13, 2018

(65) Prior Publication Data
US 2019/0204605 A1  Jul. 4, 2019

(30) Foreign Application Priority Data

Jun. 9, 2017 (CN) .......................... 201710433264.X (51) Int. Cl.
*G02B 27/14* (2006.01)
*G02B 27/01* (2006.01)
(Continued)

(52) U.S. Cl.
CPC ....... *G02B 27/0172* (2013.01); *G02B 6/0036* (2013.01); *G02B 6/12014* (2013.01);
(Continued)

(58) Field of Classification Search
CPC .............. G02B 27/0172; G02B 6/0036; G02B 6/12014; G02B 27/283; G02B 2027/0125; G02B 2027/0178
(Continued)

(56) References Cited

U.S. PATENT DOCUMENTS 7,724,441 B2    5/2010   Amitai
9,182,597 B2   11/2015   Dominici et al.
(Continued)

FOREIGN PATENT DOCUMENTS

CA    2962899 A1   4/2016
CN    1327265 C    7/2007
(Continued)

OTHER PUBLICATIONS

International Search Report and English Translation of Box V of the Written Opinion dated Aug. 8, 2018, received for corresponding PCT Application No. PCT/CN2018/088874.
(Continued)

*Primary Examiner* — William Choi
(74) *Attorney, Agent, or Firm* — Kinney & Lange, P.A.

(57) ABSTRACT

An arrayed waveguide, a display device, and a spectacles device are disclosed. The arrayed waveguide includes a first waveguide layer and a second waveguide layer stacked. The first waveguide layer includes a first main expanding portion having a plurality of first optical medium layers configured to expand, in the first direction, the first light beam incident into the first main expanding portion and reflect it towards the second waveguide layer. The second waveguide layer includes a second main expanding portion having a plurality of second optical medium layers configured to expand, in the second direction, the second light beam incident into the second main expanding portion and reflect it to exit from a side of the second waveguide layer away from the first
(Continued)

waveguide layer. The second main expanding portion is further configured to transmit the expanded first light beam therethrough.

19 Claims, 5 Drawing Sheets

(51) Int. Cl.
    *G02B 6/12*     (2006.01)
    *G02B 27/28*     (2006.01)
    *F21V 8/00*     (2006.01)

(52) U.S. Cl.
    CPC .... *G02B 27/283* (2013.01); *G02B 2027/0125* (2013.01); *G02B 2027/0178* (2013.01)

(58) Field of Classification Search
    USPC .................................. 359/629, 630, 633, 638
    See application file for complete search history.

(56) References Cited

U.S. PATENT DOCUMENTS

| | | |
|---|---|---|
| 9,310,559 B2 | 4/2016 | Macnamara |
| 9,400,395 B2 | 7/2016 | Travers et al. |
| 2010/0079865 A1 | 4/2010 | Saarikko et al. |
| 2013/0250431 A1 | 9/2013 | Robbins et al. |
| 2013/0322810 A1 | 12/2013 | Robbins |
| 2017/0031161 A1 | 2/2017 | Rossini |
| 2019/0204605 A1 | 7/2019 | Wu |

FOREIGN PATENT DOCUMENTS

| | | |
|---|---|---|
| CN | 103869406 A | 6/2014 |
| CN | 104040410 A | 9/2014 |
| CN | 104216120 A | 12/2014 |
| CN | 104737061 A | 6/2015 |
| CN | 205787362 U | 12/2016 |
| CN | 106597672 A | 4/2017 |
| CN | 107238928 A | 10/2017 |
| EP | 2733517 A1 | 5/2014 |
| WO | 2007029032 A1 | 3/2007 |

OTHER PUBLICATIONS

First Chinese Office Action dated Feb. 2, 2019, received for corresponding Chinese Application No. 201710433264.X.

ARRAYED WAVEGUIDE, DISPLAY DEVICE AND SPECTACLES DEVICE

CROSS-REFERENCE TO RELATED APPLICATION

This application is a Section 371 National Stage Application of International Application No. PCT/CN2018/088874, filed on May 29, 2018, entitled "ARRAYED WAVEGUIDE, DISPLAY DEVICE AND SPECTACLES DEVICE", which claims the benefit of Chinese Patent Application No. 201710433264.X filed on Jun. 9, 2017 in the China National Intellectual Property Administration, the whole disclosure of which is incorporated herein by reference.

TECHNICAL FIELD

The present disclosure relates to the field of augmented reality, and more particularly to an arrayed waveguide, a display device, and a spectacles device.

BACKGROUND

In the related art of the augmented reality (AR) spectacles having geometric optical waveguides, the reflectors stacking is usually performed in only one direction, and the exit pupil expansion is thus realized in only one direction, generally in the horizontal direction. The field of view (FOV) of 40° may be achieved, with almost no expansion in the vertical direction, however. The magnitude of the field of view is completely dependent on the size of the projection lens.

SUMMARY

An embodiment of the present disclosure provides an arrayed waveguide, including: a first waveguide layer and a second waveguide layer which are stacked; wherein the first waveguide layer includes a first main expanding portion including a plurality of first optical medium layers sequentially arranged in a first direction, the plurality of first optical medium layers are configured to expand, in the first direction, a first light beam incident into the first main expanding portion and to reflect the expanded first light beam toward the second waveguide layer, and at least one of the plurality of first optical medium layers is configured to transmit a portion of the first light beam and reflect another portion of the first light beam, and the second waveguide layer includes a second main expanding portion including a plurality of second optical medium layers sequentially arranged in a second direction, the plurality of second optical medium layers are configured to expand, in the second direction, a second light beam incident into the second main expanding portion and reflect the expanded second light beam to exit from a side of the second waveguide layer that faces away from the first waveguide layer, the second main expanding portion are further configured to transmit the expanded first light beam through the second main expanding portion, and at least one of the plurality of second optical medium layers are configured to transmit a portion of the second light beam and reflect another portion of the second light beam, wherein an angle between the first direction and the second direction is greater than 0 degree and less than 180 degrees.

In some embodiments, the first waveguide layer further includes a first auxiliary expanding portion including a plurality of third optical medium layers sequentially arranged in the second direction, the plurality of third optical medium layers are configured to expand, in the second direction, a third light beam incident into the first auxiliary expanding portion to form the first light beam and to reflect the first light beam toward the first main expanding portion, and at least one of the plurality of third optical medium layers are configured to transmit a portion of the third light beam and reflect another portion of the third light beam, and the second waveguide layer further includes a second auxiliary expanding portion including a plurality of fourth optical medium layers sequentially arranged in the first direction, the plurality of fourth optical medium layers are configured to expand, in the first direction, a fourth light beam incident into the second auxiliary expanding portion to form the second light beam and to reflect the second light beam toward the second main expanding portion, and at least one of the plurality of fourth optical medium layers are configured to transmit a portion of the fourth light beam and reflect another portion of the fourth light beam.

In some embodiments, the first waveguide layer further includes a first light incident portion for receiving a fifth light beam, the first light incident portion is provided with a beam splitting surface, and the beam splitting surface is configured to reflect a portion of the fifth light beam toward the first auxiliary expanding portion to form the third light beam and transmit another portion of the fifth light beam toward the second waveguide layer to form the fourth light beam; and the second waveguide layer further includes a second light incident portion for receiving the fourth light beam, the second light incident portion is provided with a light reflecting surface, and the light reflecting surface is configured to reflect the fourth light beam into the second auxiliary expanding portion.

In some embodiments, the first direction and the second direction are perpendicular to each other.

In some embodiments, at least one of the plurality of first optical medium layers and at least one of the plurality of third optical medium layers are partially transmissive and partially reflective for a first linearly polarized light; and at least one of the plurality of the second optical medium layers and at least one of the plurality of fourth optical medium layers are partially transmissive and partially reflective for a second linearly polarized light and are at least partially transmissive for the first linearly polarized light, and a polarization direction of the first linearly polarized light is perpendicular to a polarization direction of the second linearly polarized light.

In some embodiments, an optical element for changing a polarization state of light is provided between the first light incident portion and the second light incident portion.

In some embodiments, the optical element includes a half-wave plate.

In some embodiments, each of the first optical medium layers has an angle of 40° to 50° with respect to a first plane; each of the second optical medium layers has an angle of 40° to 50° with respect to the first plane; each of the third optical medium layers has an angle of 40° to 50° with respect to a second plane; each of the fourth optical medium layers has an angle of 40° to 50° with respect to the second plane; the first plane is a plane that is parallel to the first direction and parallel to the second direction; and the second plane is a plane that is parallel to the first direction and parallel to a third direction which is perpendicular to both the first direction and the second direction.

In some embodiments, each of the first optical medium layers has an angle of 45° with respect to the first plane; each of the second optical medium layers has an angle of 45° with respect to the first plane; each of the third optical medium layers has an angle of 45° with respect to the second plane; and each of the fourth optical medium layers has an angle of 45° with respect to the second plane.

In some embodiments, the beam splitting surface has a transmission reflection ratio of 1:1, and the light reflecting surface has a transmission reflection ratio of 0.

In some embodiments, transmission reflection ratios of the plurality of first optical medium layers to the first light beam are decreased downstream along an optical path of the first light beam in the first direction.

In some embodiments, one of the plurality of first optical medium layers that is located the most downstream of the optical path in the first direction has a transmission reflection ratio of 0 to the first light beam.

In some embodiments, transmission reflection ratios of the plurality of second optical medium layers to the second light beam are decreased downstream along an optical path of the second light beam in the second direction.

In some embodiments, one of the plurality of second optical medium layers that is located the most downstream of the optical path in the second direction has a transmission reflection ratio of 0 to the second light beam.

In some embodiments, the first light beam is a first linearly polarized light while the second light beam is a second linearly polarized light, and a polarization direction of the first linearly polarized light is perpendicular to a polarization direction of the second linearly polarized light.

An embodiment of the present disclosure also provides a display device including: the arrayed waveguide as described above.

An embodiment of the present disclosure also provides a display device including: the arrayed waveguide as described above; and a light beam projector configured to project a fifth light beam to the first light incident portion of the first waveguide layer.

An embodiment of the present disclosure also provides a smart spectacles system which includes a lens that includes an arrayed waveguide as described above.

BRIEF DESCRIPTION OF THE DRAWINGS

In order to more clearly illustrate the technical solutions of the embodiments of the present disclosure or in the related art, the drawings to be used in the description of the embodiments or the related art will be briefly described below. Apparently, the drawings described below are merely embodiments of the present disclosure and other different drawings may be obtained by those skilled in the art without any creative efforts.

DETAILED DESCRIPTION OF EMBODIMENTS

The technical solutions in the embodiments of the present disclosure will be described clearly and completely in the following with reference to the accompanying drawings in the embodiments of the present disclosure. It is obvious that the described embodiments are only part of the embodiments of the present disclosure, rather than all the embodiments. Based on the described embodiments in the present disclosure, all of other embodiment(s) that can be obtained by those skilled in the art without any creative efforts should fall within the scope of the present disclosure.

Unless otherwise defined, technical terms or scientific terms used herein refer to the ordinary meaning as understood by those skilled in the art. The words "first", "second" and the like used in the description and claims of the present disclosure are not intended to indicate any order, quantity, or priority, but are merely used to distinguish different components.

In the embodiment shown in FIGS. 1 to 4, the first direction corresponds to the X direction shown in the drawings, the second direction corresponds to the Y direction shown in the drawings, and the third direction corresponds to the Z direction shown in the drawings. However, the definitions of the first direction, the second direction, and the third direction are not limited thereto, and they may be defined by other alternative manners in other alternative embodiments.

In the embodiment shown in FIGS. 1 to 4, the first plane corresponds to the XY plane shown in the drawings, i.e., the plane parallel to both the X direction and the Y direction; the second plane corresponds to the XZ plane shown in the drawings, i.e., a plane parallel to both the X direction and the Z direction; the third plane corresponds to the YZ plane shown in the drawings, i.e., a plane parallel to both the Y direction and the Z direction.

The transmission reflection ratio in the present disclosure refers to the ratio of the intensity of transmitted light to the intensity of reflected light when light is incident on an optical medium layer.

The first linearly polarized light and the second linearly polarized light in the present disclosure may be any form of linearly polarized lights and their polarization directions are perpendicular to each other. In an embodiment, P light and S light are taken as an example: when the first linearly polarized light is S light, the second linearly polarized light is P light; in contrast, when the first linearly polarized light is P light, the second linearly polarized light is S light.

The explanation of P light and S light in the present disclosure is as follows: when the light beam is incident onto an interface between optical media (for example, a surface of an optical element such as a beam splitter) at a non-perpendicular angle, the reflection and transmission characteristics are both dependent on the polarization phenomenon. In this case, the employed coordinate system is defined by the plane (the normal face of the interface) which contains the incident light beam and the reflected light beam. If the polarization vector of the light is parallel to the plane, it is called as P-polarized light, abbreviated as P light. If its polarization vector is perpendicular to the plane, it is called S-polarized light, abbreviated as S light. Any of the input polarization states can be expressed as a vector sum of the S and P components.

An embodiment of the present disclosure provides an arrayed waveguide 1 as shown in FIGS. 1-4. The arrayed waveguide includes a first waveguide layer 100 and a second waveguide layer 200 which are stacked. The first waveguide layer 100 includes a first main expanding portion 120. The first main expanding portion 120 includes a plurality of first optical medium layers 121 arranged in a first direction (e.g., X direction) in sequence. The plurality of first optical medium layers 121 are configured to expand, in the first direction, the first light beam 10 incident into the first main expanding portion 120 and to reflect the expanded first light beam 10 toward the second waveguide layer 200. At least one of the plurality of first optical medium layers 121 is configured to transmit a portion of the first light beam 10 and reflect another portion of the first light beam 10. In some embodiments, the plurality of first optical medium layers 121 may each be partially reflective and partially transmissive to the first light beam 10. Thereby, the first light beam 10 is transmitted and reflected in sequence so as to expand the first light beam 10 in the first direction, thereby increasing the field of view, in the first direction, of the light beam emitted from the arrayed waveguide. The expanded first light beam 10 may include a plurality of sub-beams arranged in the first direction.

Similarly, the second waveguide layer 200 may include a second main expanding portion 220. The second main expanding portion 220 includes a plurality of second optical medium layers 221 arranged in a second direction (for example, a Y direction) in sequence. The plurality of second optical medium layers 221 are configured to expand, in the second direction, the second light beam 20 incident into the second main expanding portion 220 and reflect the expanded second light beam 20 to exit from the side of the second waveguide layer 200 that faces away from the first waveguide layer 100. At least one of the plurality of second optical medium layers 221 is configured to transmit a portion of the second light beam 20 and reflect another portion of the second light beam 20. In some embodiments, the plurality of second optical medium layers 221 may each be partially reflective and partially transmissive to the second light beam 20. Thereby, the second light beam 20 is transmitted and reflected in sequence so as to expand the second light beam 20 in the first direction, thereby increasing the field of view, in the second direction, of the light beam emitted from the arrayed waveguide. The expanded second light beam 20 may include a plurality of sub-beams arranged in the second direction.

Figure 4:
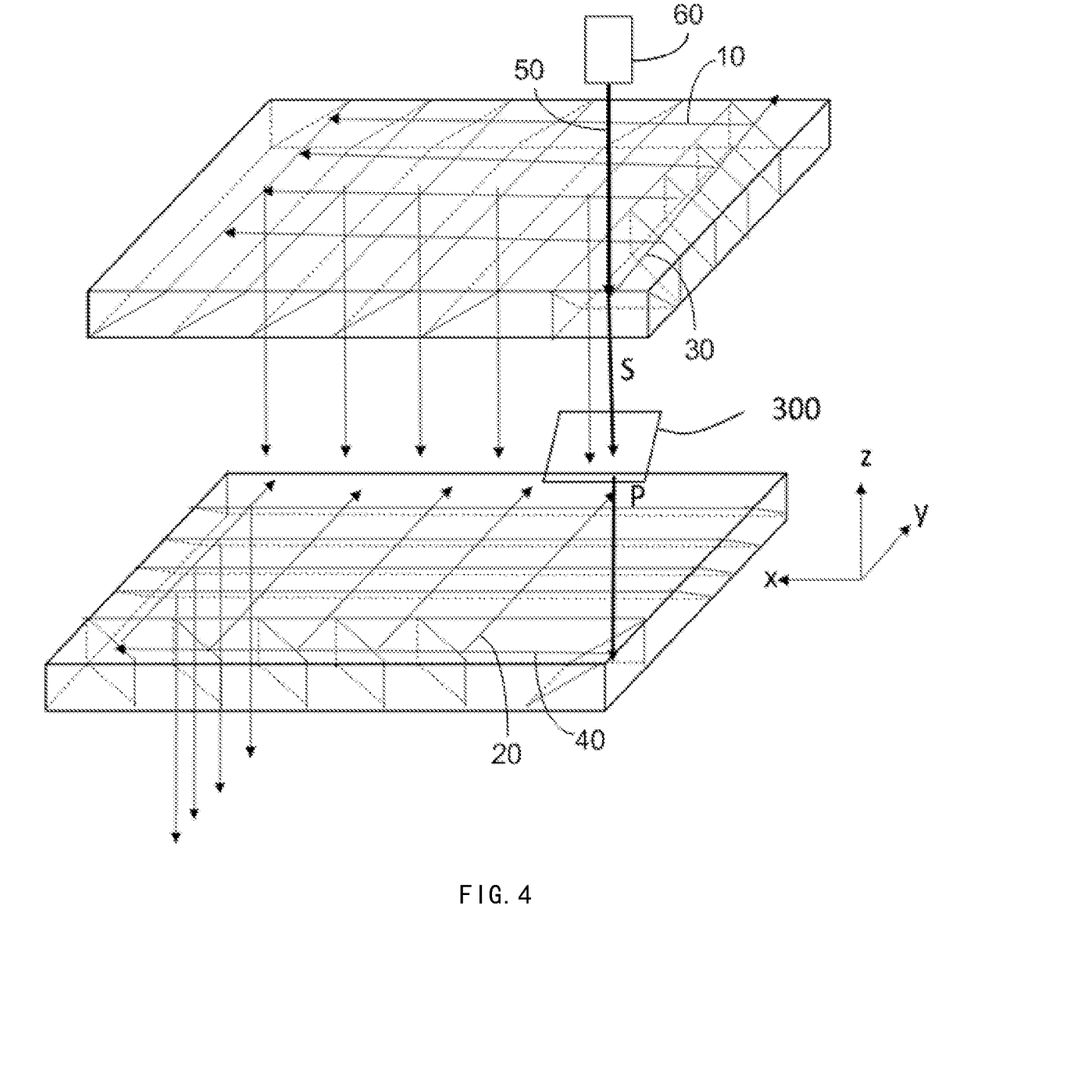
FIG. 4 schematically illustrates a configuration of an optical path of the arrayed waveguide provided by an embodiment of the present disclosure.

In order to enable the expanded first light beam 10 from the first waveguide layer 100 to be emitted from the exit surface of the arrayed waveguide (the lower surface of the second waveguide layer 200 in the embodiment shown in FIG. 4) successfully, the second main expanding portion 220 may also be configured to be transmissive to the expanded first light beam 10 such that the expanded first light beam 10 can be transmitted through the second main expanding portion 220.

The double-layer arrayed waveguide structure provided by the present disclosure can realize simultaneous exit pupil expansion in two directions, thereby improving the experience of the AR display spectacles having the optical waveguide structure.

In an embodiment of the present disclosure, an angle between the first direction and the second direction (e.g., an angle between the X direction and the Y direction) is greater than 0 degrees and less than 180 degrees. For example, the angle between the first direction and the second direction (the angle between the X direction and the Y direction) is 90 degrees. That is, the first direction and the second direction may be perpendicular to each other. In this way, it is allowed that the light beam emitted from the arrayed waveguide is expanded in two perpendicular directions simultaneously, thereby increasing the field of view more uniformly.

In some embodiments of the present disclosure, the first waveguide layer 100 further includes a first auxiliary expanding portion 110. The first auxiliary expanding portion 110 includes a plurality of third optical medium layers 112 arranged in the second direction in sequence. The plurality of third optical medium layers 112 are configured to expand, in the second direction, the third light beams 30 incident into the first auxiliary expanding portion 110 to form the first light beam 10 and reflect the first light beam 10 toward the first main expanding portion 120. The first auxiliary expanding portion 110 may be pre-expanded in the second direction before the light beam is expanded by the first main expanding portion 120 in the first direction. In this way, the first light beam 10 entering the first main expanding portion 120 may have a larger width in the second direction, such that the transmission and reflection effects of the plurality of first optical medium layers 121 may be more sufficiently utilized. At least one of the plurality of third optical medium layers 112 may be configured to transmit a portion of the third light beam 30 and reflect another portion of the third light beam 30.

In some embodiments of the present disclosure, the second waveguide layer 200 further includes a second auxiliary expanding portion 210. The second auxiliary expanding portion 210 includes a plurality of fourth optical medium layers 212 arranged in the first direction in sequence. The plurality of fourth optical medium layers 212 may be configured to expand, in the first direction, the fourth light beam 40 incident into the second auxiliary expanding portion 210 to form the second light beam 20 and reflect the second light beam 20 toward the first main expanding portion 120. At least one of the plurality of fourth optical medium layers 212 may be configured to transmit a portion of the fourth light beam 40 and reflect another portion of the fourth light beam 40. Similar to the first auxiliary expanding portion 110, the second auxiliary expanding portion 210 may be pre-expanded in the first direction before the light beam is expanded by the second main expanding portion 220 in the second direction. In this way, the second light beam 20 entering the second main expanding portion 220 may have a larger width in the second direction, such that the transmission and reflection effects of the plurality of second optical medium layers 221 may be more sufficiently utilized.

In some embodiments, the first waveguide layer 100 may further include a first light incident portion 130 for receiving the fifth light beam 50. The first light incident portion 130 is provided with a beam splitting surface 111. The beam splitting surface 111 is configured to reflect a portion of the fifth light beam 50 toward the first auxiliary expanding portion 110 to form the third light beam 30 and transmit another portion of the fifth light beam 50 toward the second waveguide layer 200 to form the fourth light beam 40.

The second waveguide layer 200 may further include a second light incident portion 230 for receiving the fourth light beam 40. The second light incident portion 230 is provided with a light reflecting surface 211. The light reflecting surface 211 is configured to reflect the fourth light beam 40 into the second auxiliary expanding portion 210.

By means of the first light incident portion 130 and the second light incident portion 230 described above, the first light beam 10 and the second light beam 20 may be formed by the same light beam (e.g., the fifth light beam 50). In practice, it can be achieved conveniently that the first waveguide layer 100 and the second waveguide layer 200 expand different portions of the same beam in different directions. For example, when the fifth light beam 50 is a patterned projection beam, the first light beam 10 and the second light beam 20 may carry the same image, so that the expansion for the field of view of the same image in two directions can be conveniently achieved.

In an embodiment of the present disclosure, the first waveguide layer 100 includes a first auxiliary expanding portion 110 and a first main expanding portion 120. The first auxiliary expanding portion 110 may be configured to expand, in the Y direction, the light beam incident into the first auxiliary expanding portion and reflect it to exit from the side surface of the first auxiliary expanding portion 110 that faces toward the first main expanding portion 120. The first main expanding portion 120 is configured to expand, in the X direction, the light beam emitted from the first auxiliary expanding portion 110 and reflect it to exit from the side surface of the first main expanding portion 120 that faces toward the second waveguide layer 200. The second waveguide layer 200 includes a second auxiliary expanding portion 210 and a second main expanding portion 220. The second auxiliary expanding portion 210 is configured to expand, in the X direction, the light beam incident into the second auxiliary expanding portion 210 and reflect it to exit from the side surface of the second auxiliary expanding portion 210 that faces toward the second main expanding portion 220. The second main expanding portion 220 is configured to expand, in the Y direction, the light beam emitted from the second auxiliary expanding portion and reflect it to exit from the side surface of the second main expanding portion 220 that faces away from the first waveguide layer 100.

In some embodiments, the first light beam 10 may be a first linearly polarized light, and the second light beam 20 is a second linearly polarized light. The polarization directions of the first linearly polarized light and the second linearly polarized light are perpendicular to each other.

As an example, at least one of the plurality of first optical medium layers 121 and at least one of the plurality of third optical medium layers 112 are partially transmissive and partially reflective for the first linearly polarized light. At least one of the plurality of the second optical medium layers 221 and at least one of the plurality of fourth optical medium layers 212 are partially transmissive and partially reflective for the second linearly polarized light and at least partially transmissive to the first linearly polarized light. The polarization directions of the first linearly polarized light and the second linearly polarized light are perpendicular to each other. This ensures that the first light beam 10 is transmitted through the second waveguide layer 200 without disturbing the second light beam 20. As an example, the first optical medium layer 121 and the third optical medium layer 112 may both be partially transmissive and partially reflective for the first linearly polarized light, while the second optical medium layer 221 and the fourth optical medium layer 212 may both be partially transmissive and partially reflective for the second linearly polarized light.

Figure 1:
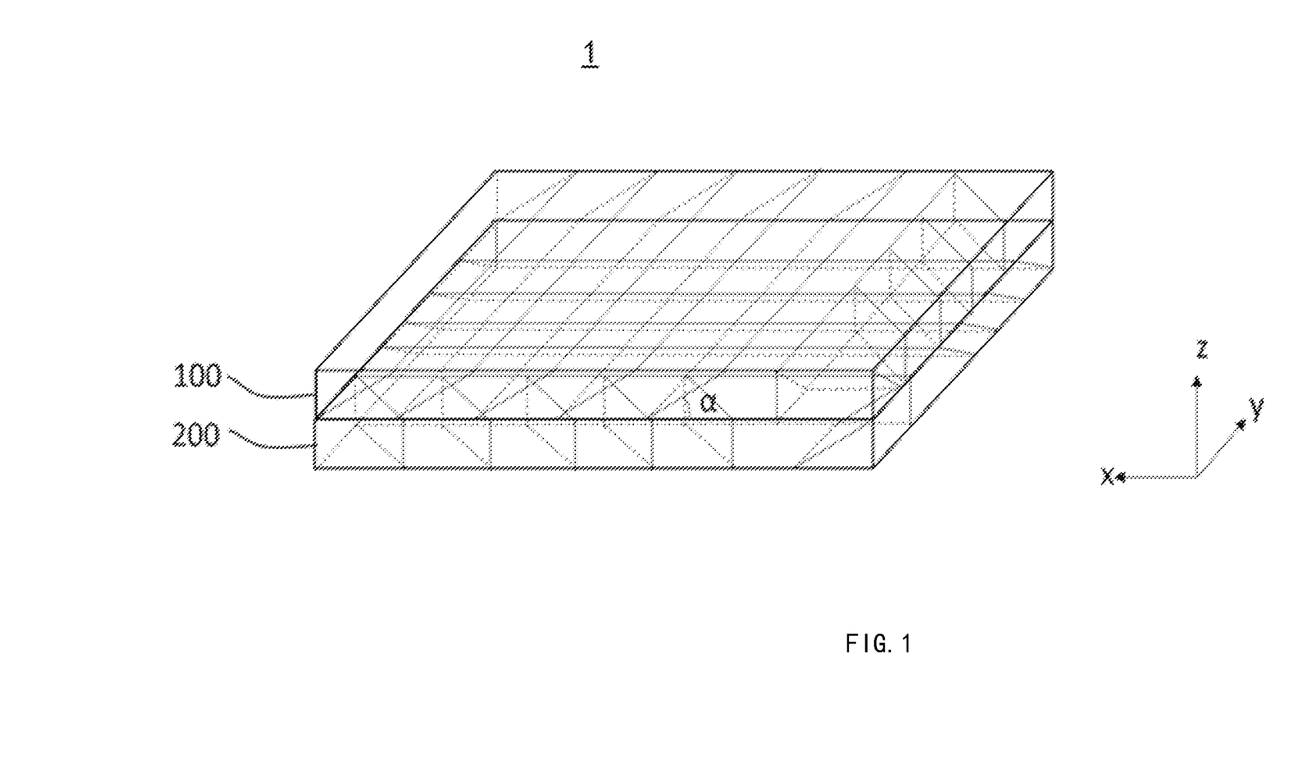
FIG. 1 schematically illustrates a configuration of an arrayed waveguide provided by an embodiment of the present disclosure.
Figure 2:
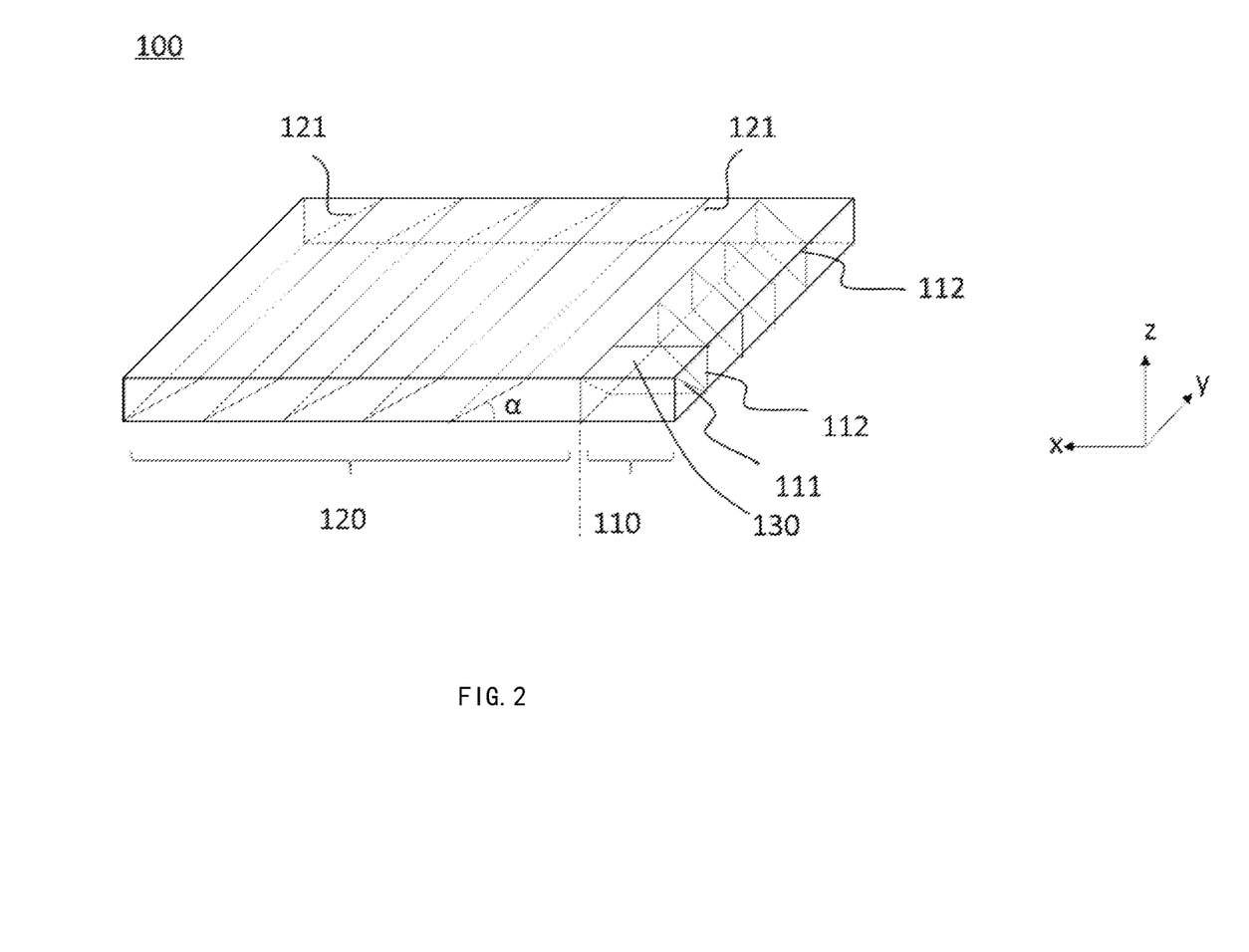
FIG. 2 schematically illustrates a configuration of a first waveguide structure of an arrayed waveguide provided by an embodiment of the present disclosure.

In order to facilitate the switch of the polarization state of the light beam between the first waveguide layer 100 and the second waveguide layer 200, in some embodiments, an optical element for changing the light polarization state, for example, a half-wave plate 300 may be provided between the first light incident portion 130 and the second light incident portion 230. The half-wave plate 300 can rotate the polarization direction of the linearly polarized light passing through the half-wave plate 300 by 90 degrees, thereby realizing the switch between the first linearly polarized light and the second linearly polarized light. However, embodiments of the present disclosure are not limited thereto, and the optical element may be implemented by other elements, such as a combination of two quarter-wave plates and the like. Referring to FIG. 2, the angle between the beam splitting surface 111 and the XY plane may be 40° to 50°, for example, 45°, and angle between the beam splitting surface 111 and the XZ plane may be 40° to 50°, for example, 45°. As described above, the beam splitting surface 111 is used to reflect 50% of the fifth light beam (e.g., emitted from the light projector) into the first auxiliary expanding portion 110 while transmitting 50% of the fifth light beam into the second light incident portion 230 of the second waveguide layer 200. As an example, the beam splitting surface 111 can be realized by an optical medium layer. The first auxiliary expanding portion 110 may include a plurality of third optical medium layers 112 which are arranged equidistantly. The third optical medium layer 112 is used to sequentially reflect the light reflected by the beam splitting surface 111 to the first main expanding portion 120. The third optical medium layer 112 is perpendicular to the XY plane and may have an angle of 40° to 50°, for example 45°, with respect to the YZ plane, and may have an angle of 40° and 50°, for example 45°, with respect to the XZ plane. In order to ensure uniformity of the light emitted from the first auxiliary expanding portion, the transmission reflection ratio of the plurality of third optical medium layers 112 in the Y direction may be sequentially decreased (downstream along the optical path), and the transmission reflection ratio of the last third optical medium layer (which is located the most downstream of the optical path) is 0.

The first main expanding portion 120 includes a plurality of first optical medium layers 121 which are arranged equidistantly. The first optical medium layer 121 is configured to reflect the light reflected from the third optical medium layer 112 again. The finally reflected light is emitted through the second waveguide layer 200. The plurality of first optical medium layers 121 are all perpendicular to the XZ plane, and may have an angle α of 40° to 50°, for example 45°, with respect to the XY plane, and may have an angle of 40° and 50°, for example 45°, with respect to the YZ plane. In order to ensure uniformity of the light emitted from the first main expanding portion 120, the transmission reflection ratio of the plurality of first optical medium layers 121 in the X direction may be sequentially decreased (downstream along the optical path), and the transmission reflection ratio of the last first optical medium layer (which is located the most downstream of the optical path) is 0.

Figure 3:
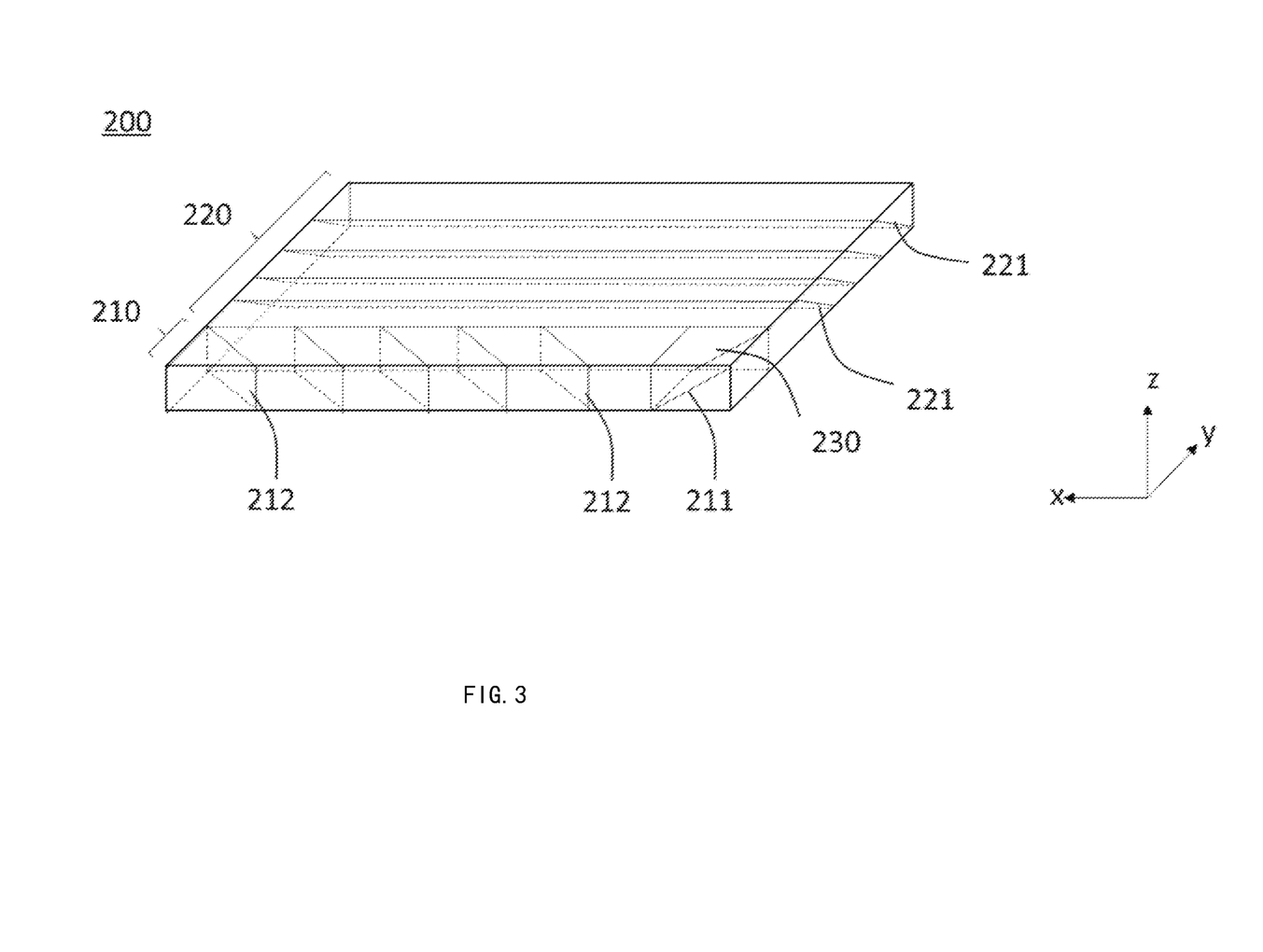
FIG. 3 schematically illustrates a configuration of a second waveguide structure of an arrayed waveguide provided by an embodiment of the present disclosure.

Referring to FIG. 3, the second auxiliary expanding portion 210 includes a second light incident portion 230. The second light incident portion 230 is provided with a light reflecting surface 211. The angle between the light reflecting surface 211 and the XY plane may be 40° to 50°, for example 45°, and the angle between the light reflecting surface 211 and the YZ plane may be 40° to 50°, for example, 45°. The light reflecting surface 211 is used to reflect all of the light transmitted through the first light incident portion 130 to the second auxiliary expanding portion 210, that is, the transmission reflection ratio is 0. The second auxiliary expanding portion 210 includes a plurality of fourth optical medium layers 212 which are equidistantly arranged and configured to sequentially reflect the light reflected by the light reflecting surface 211 into the second main expanding portion 220. The plurality of fourth optical medium layers 212 are perpendicular to the XY plane respectively, and may have an angle of 40° to 50° with respect to the XZ plane, for example 45°, and may have an angle of 40° to 50° with respect to the YZ plane, for example 45°. In order to ensure uniformity of the light emitted from the second auxiliary expanding portion, the transmission reflection ratio of the plurality of fourth optical medium layers 212 in the X direction may be sequentially decreased (downstream along the optical path), and the transmission reflection ratio of the last fifth optical medium layer (which is located the most downstream of the optical path) is 0.

The second main expanding portion 220 includes a plurality of second optical medium layers 221 which are equidistantly arranged and configured to reflect the light reflected from the second auxiliary expanding portion 210 again. The plurality of second optical medium layers 221 are perpendicular to the YZ plane, respectively, and may have an angle of 40° to 50° with respect to the XY plane, for example 45°, and may have an angle of 40° to 50° with respect to the XZ plane, for example 45°. In order to ensure uniformity of the light emitted from the second main expanding portion, the transmission reflection ratio of the plurality of second optical medium layers 221 in the Y direction may be sequentially decreased (downstream along the optical path), and the transmission reflection ratio of the last sixth optical medium layer (which is located the most downstream of the optical path) is 0.

In an embodiment, as shown in FIG. 4, as described above, a half-wave plate 300 is disposed between the first light incident portion 130 and the second light incident portion 230 for changing the polarization state of the light transmitted through the half-wave plate 300. The light emitted by the light beam projector (for example, a projector) is S light. The S light is incident into the first light incident portion 130 and passes through the first optical medium layer 111. 50% of the S light is transmitted through the first optical medium layer 111 and incident into the half-wave plate 300. The half-wave plate 300 converts the S light into P light. The P light is then incident into the second light incident portion 230. The second optical medium layer, the fourth optical medium layer, and the light reflecting surface in the second waveguide layer 200 have the characteristic of transmitting S light and partially reflecting P light. Thus, the S light emitted from the first waveguide layer 100 may be completely transmitted through the second waveguide layer 200, without influence on the light emitted from the first waveguide layer 100 except the light incident portion 130.

It is noted that, optionally, the light emitted by the light beam projector may be P light. In this case, the first optical medium layer 121, the third optical medium layer 112, and the beam splitting surface 111 have the characteristic of partially reflecting P light, and the second optical medium layer 221, the fourth optical medium layer 212, and the light reflecting surface 211 have the characteristic of transmitting P light and partially reflecting S light. In this case, the half-wave plate converts the P light into the S light. In this way, the technical effects of the present disclosure can also be realized.

Another embodiment of the present disclosure provides a display device including a light beam projector 60 and an arrayed waveguide as described in any of the above embodiments. As an example, the light beam projector 60 may be disposed above the first light incident portion 130 so as to project a fifth light beam into the first light incident portion. The display device may include any product or component having a display function, such as a micro display device, such as a LCOS (Liquid Crystal on Silicon) reflective projection display device.

Figure 5:
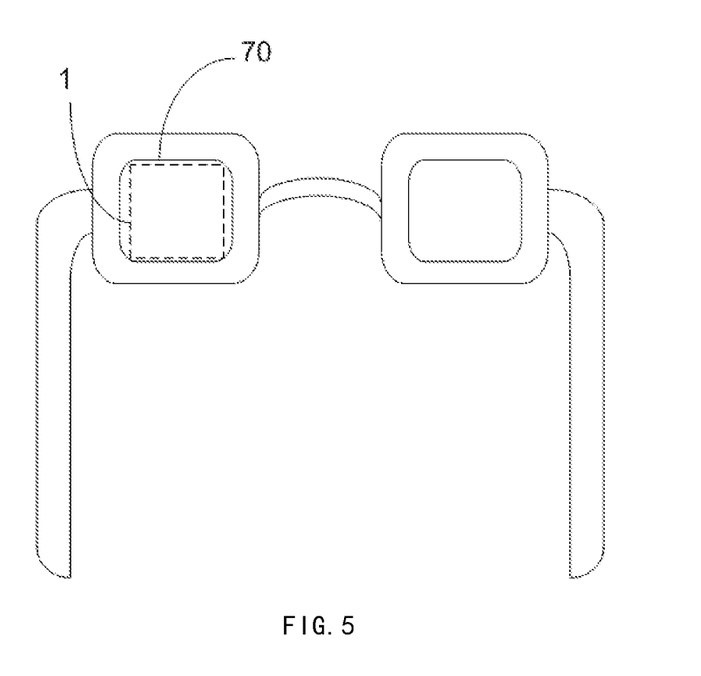
FIG. 5 schematically illustrates a configuration of a smart spectacles system according to an embodiment of the present disclosure.

Embodiments of the present disclosure also provide a spectacles device, as shown in FIG. 5. The spectacles device includes a lens 70. The lens 70 includes the arrayed waveguide 1 as described in any of the above embodiments. The lens 70 can increase the field of view of the spectacles device, providing a more comfortable augmented reality experience.

The above is only the specific embodiment of the present disclosure, but the scope of the present disclosure is not limited thereto. Any person skilled in the art can readily conceive modification or substitutions within the technical scope of the disclosure, which should fall within the scope of protection of the present disclosure. Therefore, the scope of protection of the present disclosure should be defined by the scope of the claims.

What is claimed is:

1. An arrayed waveguide, comprising:
   a first waveguide layer and a second waveguide layer which are stacked;
   wherein the first waveguide layer comprises a first main expanding portion comprising a plurality of first optical medium layers sequentially arranged in a first direction, the plurality of first optical medium layers are configured to expand, in the first direction, a first light beam incident into the first main expanding portion and to reflect the expanded first light beam toward the second waveguide layer, and at least one of the plurality of first optical medium layers is configured to transmit a portion of the first light beam and reflect another portion of the first light beam, and
   the second waveguide layer comprises a second main expanding portion comprising a plurality of second optical medium layers sequentially arranged in a second direction, the plurality of second optical medium layers are configured to expand, in the second direction, a second light beam incident into the second main expanding portion and reflect the expanded second light beam to exit from a side of the second waveguide layer that faces away from the first waveguide layer, the second main expanding portion are further configured to transmit the expanded first light beam through the second main expanding portion, and at least one of the plurality of second optical medium layers are configured to transmit a portion of the second light beam and reflect another portion of the second light beam,
   wherein an angle between the first direction and the second direction is greater than 0 degree and less than 180 degrees,
   wherein the first waveguide layer further comprises a first auxiliary expanding portion comprising a plurality of third optical medium layers sequentially arranged in the second direction, the plurality of third optical medium layers are configured to expand, in the second direction, a third light beam incident into the first auxiliary expanding portion to form the first light beam and to reflect the first light beam toward the first main expanding portion, and at least one of the plurality of third optical medium layers are configured to transmit a portion of the third light beam and reflect another portion of the third light beam, and
   wherein the second waveguide layer further comprises a second auxiliary expanding portion comprising a plurality of fourth optical medium layers sequentially arranged in the first direction, the plurality of fourth optical medium layers are configured to expand, in the first direction, a fourth light beam incident into the second auxiliary expanding portion to form the second light beam and to reflect the second light beam toward the second main expanding portion, and at least one of the plurality of fourth optical medium layers are configured to transmit a portion of the fourth light beam and reflect another portion of the fourth light beam.

2. The arrayed waveguide of claim 1, wherein, the first waveguide layer further comprises a first light incident portion for receiving a fifth light beam, the first light incident portion is provided with a beam splitting surface, and the beam splitting surface is configured to reflect a portion of the fifth light beam toward the first auxiliary expanding portion to form the third light beam and transmit another portion of the fifth light beam toward the second waveguide layer to form the fourth light beam; and the second waveguide layer further comprises a second light incident portion for receiving the fourth light beam, the second light incident portion is provided with a light reflecting surface, and the light reflecting surface is configured to reflect the fourth light beam into the second auxiliary expanding portion.

3. The arrayed waveguide of claim 2, wherein an optical element for changing a polarization state of light is provided between the first light incident portion and the second light incident portion.

4. The arrayed waveguide of claim 2, wherein the optical element comprises a half-wave plate.

5. The arrayed waveguide of claim 2, wherein, the beam splitting surface has a transmission reflection ratio of 1:1, and the light reflecting surface has a transmission reflection ratio of 0.

6. A display device, comprising:
the arrayed waveguide according to claim 2; and
a light beam projector configured to project the fifth light beam to the first light incident portion of the first waveguide layer.

7. The arrayed waveguide of claim 1, wherein the first direction and the second direction are perpendicular to each other.

8. The arrayed waveguide of claim 1, wherein, at least one of the plurality of first optical medium layers and at least one of the plurality of third optical medium layers are partially transmissive and partially reflective for a first linearly polarized light; and at least one of the plurality of the second optical medium layers and at least one of the plurality of fourth optical medium layers are partially transmissive and partially reflective for a second linearly polarized light and are at least partially transmissive for the first linearly polarized light, and a polarization direction of the first linearly polarized light is perpendicular to a polarization direction of the second linearly polarized light.

9. The arrayed waveguide of claim 1, wherein,
each of the first optical medium layers has an angle of 40° to 50° with respect to a first plane;
each of the second optical medium layers has an angle of 40° to 50° with respect to the first plane;
each of the third optical medium layers has an angle of 40° to 50° with respect to a second plane;
each of the fourth optical medium layers has an angle of 40° to 50° with respect to the second plane; and the first plane is a plane that is parallel to the first direction and parallel to the second direction; and the second plane is a plane that is parallel to the first direction and parallel to a third direction which is perpendicular to both the first direction and the second direction.

10. The arrayed waveguide of claim 9, wherein,
each of the first optical medium layers has an angle of 45° with respect to the first plane;
each of the second optical medium layers has an angle of 45° with respect to the first plane;
each of the third optical medium layers has an angle of 45° with respect to the second plane; and
each of the fourth optical medium layers has an angle of 45° with respect to the second plane.

11. The arrayed waveguide of claim 1, wherein transmission reflection ratios of the plurality of first optical medium layers to the first light beam are decreased downstream along an optical path of the first light beam in the first direction.

12. The arrayed waveguide of claim 11, wherein one of the plurality of first optical medium layers that is located the most downstream of the optical path in the first direction has a transmission reflection ratio of 0 to the first light beam.

13. The arrayed waveguide of claim 1, wherein transmission reflection ratios of the plurality of second optical medium layers to the second light beam are decreased downstream along an optical path of the second light beam in the second direction.

14. The arrayed waveguide of claim 13, wherein one of the plurality of second optical medium layers that is located the most downstream of the optical path in the second direction has a transmission reflection ratio of 0 to the second light beam.

15. The arrayed waveguide of claim 1, wherein the first light beam is a first linearly polarized light while the second light beam is a second linearly polarized light, and a polarization direction of the first linearly polarized light is perpendicular to a polarization direction of the second linearly polarized light.

16. A display device, comprising:
the arrayed waveguide according to claim 1.

17. A spectacles device, comprising a lens having the arrayed waveguide according to claim 1.

18. The arrayed waveguide of claim 1, wherein the first light beam and the second light beam are formed by the same light beam.

19. The arrayed waveguide of claim 1, wherein the plurality of first optical medium layers are arranged equidistantly and the plurality of second optical medium layers are arranged equidistantly.

* * * * *